Figure 1:
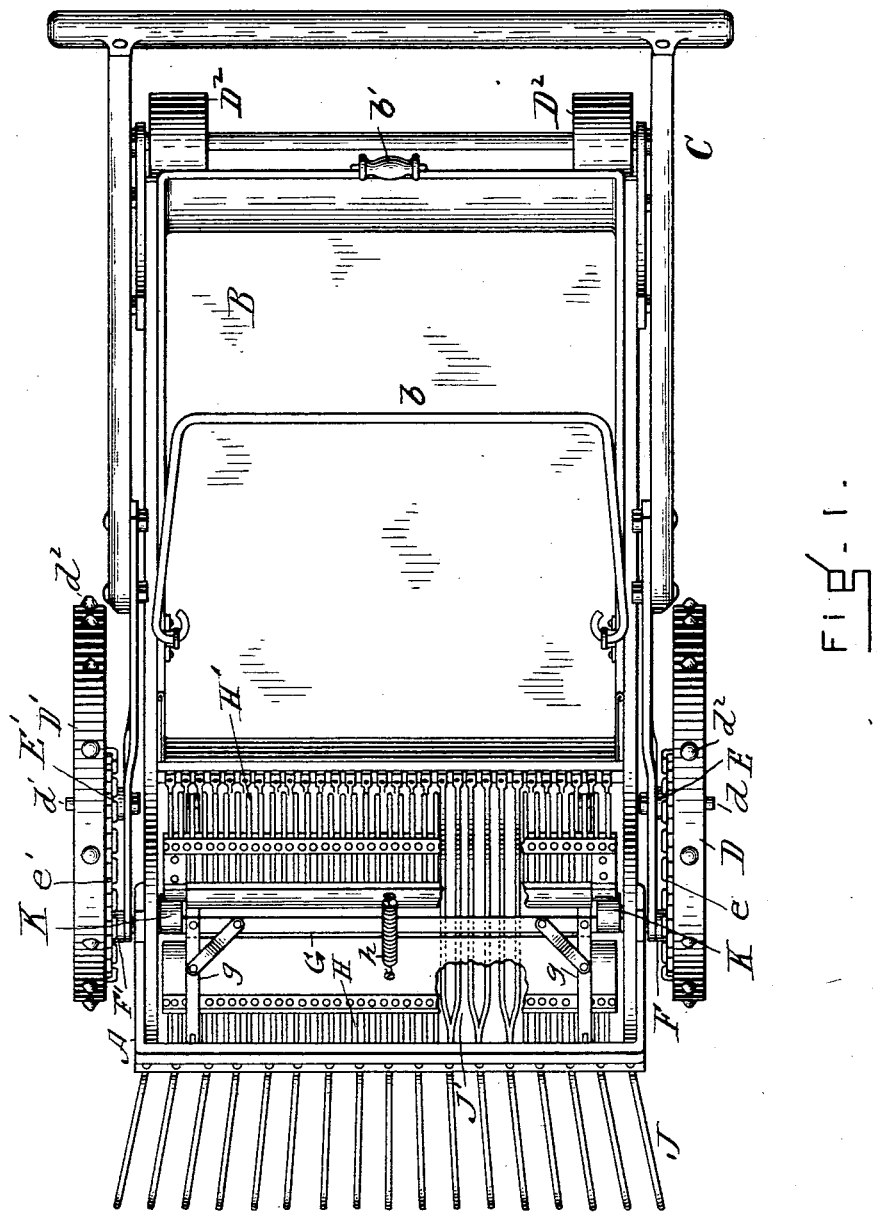

(No Model.) 2 Sheets—Sheet 1.

A. H. BASSETT & A. H. BASSETT, Jr.
MACHINE FOR PICKING BERRIES.

No. 541,307. Patented June 18, 1895.

WITNESSES.
O. R. Mitchell.
John R. Snow.

INVENTORS.
Albert H. Bassett, and
Albert H. Bassett Jr.
by their attorney, (No Model.) 2 Sheets—Sheet 2.
A. H. BASSETT & A. H. BASSETT, Jr.
MACHINE FOR PICKING BERRIES.
No. 541,307. Patented June 18, 1895.
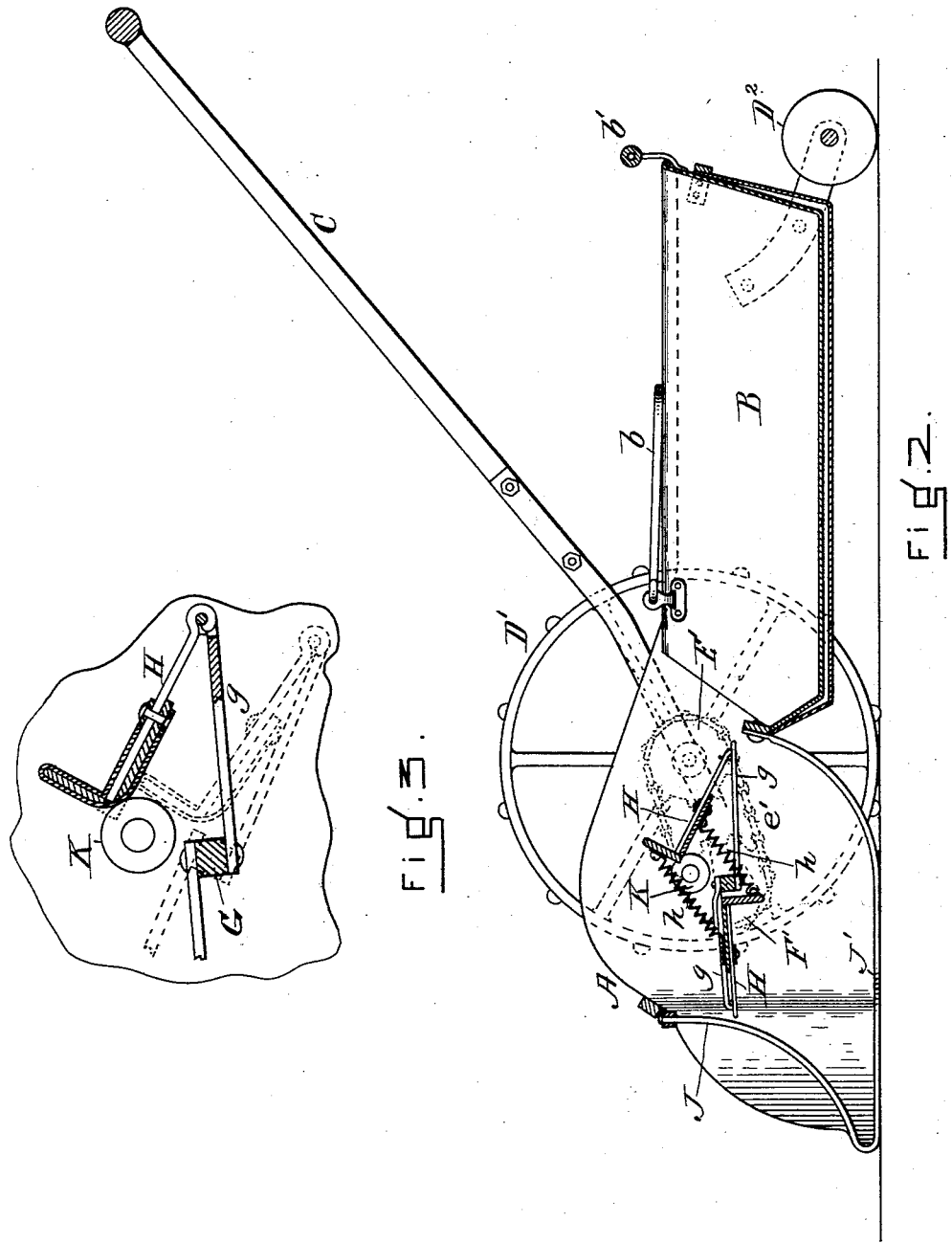
WITNESSES.
O. R. Mitchell.
John R. Snow.
INVENTORS.
Albert H. Bassett
Albert H. Bassett Jr.
by their attorney.

UNITED STATES PATENT OFFICE.

ALBERT H. BASSETT AND ALBERT HENRY BASSETT, JR., OF ORLEANS, MASSACHUSETTS.

MACHINE FOR PICKING BERRIES.

SPECIFICATION forming part of Letters Patent No. 541,307, dated June 18, 1895.

Application filed November 10, 1894. Serial No. 528,372. (No model.)

*To all whom it may concern:*

Be it known that we, ALBERT H. BASSETT and ALBERT HENRY BASSETT, Jr., of Orleans, in the county of Barnstable and State of Massachusetts, have invented a new and useful Machine for Picking Berries, of which the following is a specification, reference being had to the accompanying drawings, in which—

Figure 1 is a plan; Fig. 2, a sectional elevation. Fig. 3 is a detail illustrating the discharging of the berries from the picker-fingers.

Our invention is a berry picking machine and consists in the combination of picker fingers upon a rotating shaft and a rake, all so organized as to receive and hold the berries as they are stripped from the vines and to automatically deposit them in a receptacle.

In the drawings A is the frame of the machine.

B is the box or receptacle for receiving the berries as they are stripped from the vines and $b$ and $b'$ bails or handles by which the receptacle is handled.

C is the handle by which the machine is propelled.

D and D' are wheels which are the main supports of the machine and which are journaled each upon its axle $d$ and $d'$.

$D^2$ are smaller wheels supporting the rear of the machine.

The tires of D D' are broad and carry bosses $d^2$ to enable wheels D D', the better to serve their function of actuating wheels for the picker finger mechanism. Upon the hubs of D D' sprocket wheels E E' are secured which by means of sprocket chains $e$ $e'$ actuate sprocket wheels F F' fast to the two ends of shaft G which carries picker finger carriers H by means of the arms $g$. The picker fingers H' are attached to the carriers and consist of a series of wires arranged at a suitable distance apart to prevent a berry from passing through.

J is the main rake attached to the forward end of the machine, its teeth being fastened at their front and rear ends to the frame of the machine as clearly shown in Fig. 2. The horizontal portions of the teeth are brought close enough together to prevent a berry from passing through as shown at J', Fig. 1. Springs $h$ connect the two picker finger carriers and tend constantly to keep them in identical positions upon opposite sides of the shaft G. The picker finger carriers H are hinged at their outer ends to the arms $g$ (as shown clearly in Fig. 3) and by means of roll K the picker fingers and their carrier, are tilted to discharge the accumulated berries into box B before the fingers are carried around again to co-operate with the main rake J.

The operation is as follows: The machine being more especially adapted to the gathering of cranberries, the operator pushes the machine over the bog the teeth J of the main rake running through the vines and the picker fingers in their revolution co-operate with the horizontal portions of teeth J to strip the berries from the vines and carry the berries up to the point where the roll K tilts the picker finger carrier and discharges the berries into box B. (See Fig. 3.)

What we claim as our invention is—

1. In a berry picking machine the combination of a main rake; a shaft; arms fast to the shaft; a carrier hinged to those arms; picker fingers on that carrier; and rolls in the path of the carrier to tilt it and discharge the berries; all substantially as described.

2. The main rake, consisting of a plurality of wires attached at one end to the front of the machine thence bent with an inward curve to the front, where it is bent double to form a rounded point; thence extending back and bent upward to the rear point of attachment, as set forth.

ALBERT H. BASSETT.
ALBERT HENRY BASSETT, JR.

Witnesses:
CHAS. R. SMITH,
JOSEPH W. PERCIVAL.